Figure 1:
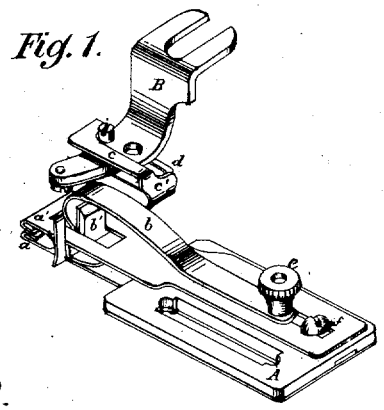
Figure 2:
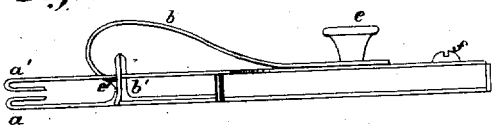
Figure 3:
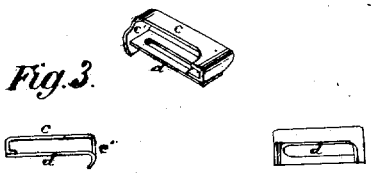
Figure 4:
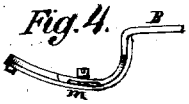
Figure 5:
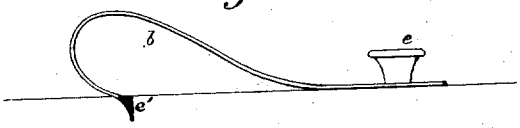
Figure 6:
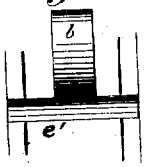

William N. Martin.

Binders for Sewing Machines.

4376

REISSUED MAY. 9 1871

Witnesses:
Fred. Artos
R. D. Evans

Inventor:
William N. Martin
by his Attys.
A. H. & R. H. Evans

United States Patent Office.

WILLIAM NELSON MARTIN, OF BOSTON, MASSACHUSETTS.

Letters Patent No. 109,366, dated November 15, 1870; reissue No. 4,376, dated May 9, 1871.

IMPROVEMENT IN BINDERS FOR SEWING-MACHINES.

The Schedule referred to in these Letters Patent and making part of the same.

*To all whom it may concern:*

Be it known that I, WILLIAM NELSON MARTIN, of Boston, in the county of Suffolk and State of Massachusetts, have invented a new and useful Improvement in Binders for Sewing-Machines, of which the following is a full, clear, and exact description, reference being had to the accompanying drawing making part of this specification, in which—

Figure I is a perspective view of my binder with the presser-foot in position.

Figure II is a side view of a portion of my binder separated from the improvement attached to the presser-foot.

Figure III is a view of the binder-slide and spring detached from the presser-foot and in three positions.

Figure IV is a side view of the presser-foot, showing the groove in which the binder-slide moves, and an under plate which holds the slide in place.

My invention relates to binder attachments for sewing-machines, and consists of the combination and arrangement of the several parts, as hereinafter particularly set forth and described.

To enable others skilled in the art to make and use my invention, I will proceed to describe the manner in which I have carried it out.

In the drawing—

A represents the plate of an ordinary binder, and *a a'* the arms

The spring slide *b* is curved over and bears against the outer face of the guide *b'*, (see Fig. II,) and is held in position by means of the adjusting-screw *e*.

The upper arm *a'* is adjustable by means of the screw *f*, while the lower arm is stationary and not adjustable.

Rigidly attached to the end of the spring slide *b* is a transverse curved plate or bar, *e'*, for curving or shaping the space in lower angle formed by the arm *a'* and the guide *b'*, (see Figure V,) thus securing a rounded or curved adjustable pressing surface upon the binding, whatever may be the thickness of the cloth which is being bound.

B is an ordinary presser-foot with a groove, *m*, in the lower side, in which moves the slotted slide *d*, to which is attached the spring *c*, with its curved end *c'* fitting snugly over the curved end of the slide *d*.

These curved ends catch the binding as it passes from the arms of the binder, and bear it smoothly and tightly against the edge of the goods, giving it the desired shape, and fitting it to the rounded edges of the work.

The spring *c* is securely attached at its outer end to slide *d*, and, by its perpendicular motion, is adjustable to any thickness of cloth or binding passing under the presser-foot.

Having thus described my invention,

What I claim as new, and desire to secure by Letters Patent, is—

1. The combination of the arms *a a'*, guide *b'*, slide *b*, with the presser-foot provided with the slide *d* and hooked spring *c*.

2. The adjustable curved plate or bar *e'*, in combination with the arms *a a'* and guide *b'*, constructed and arranged substantially as and for the purpose specified.

3. The hooked spring *c* and slide *d*, in combination with and adjustable on the presser-foot, as and for the purpose described.

WM. N. MARTIN.

Witnesses:

A. H. EVANS,

THOMAS C. CONNOLLY.